H. D. KUHLMAN.
ANIMAL DEHORNING STOCK.
APPLICATION FILED NOV. 13, 1918.
1,323,072.
Patented Nov. 25, 1919.
2 SHEETS—SHEET 1.
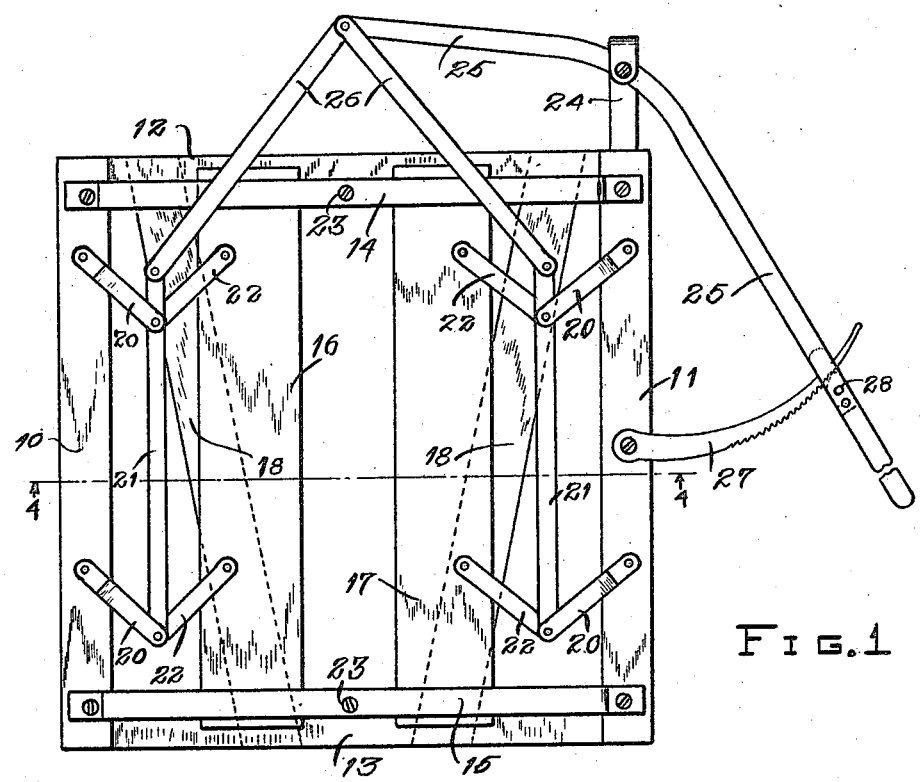
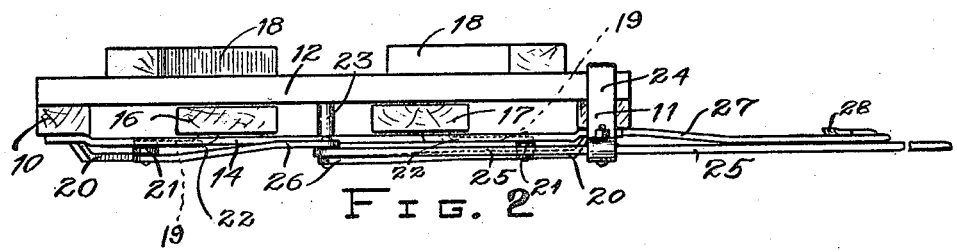
Inventor
H. D. Kuhlman
Attorneys

UNITED STATES PATENT OFFICE.

HENRY D. KUHLMAN, OF WESTPOINT, NEBRASKA.

ANIMAL-DEHORNING STOCK.

1,323,072.  Specification of Letters Patent.  Patented Nov. 25, 1919.

Application filed November 13, 1918. Serial No. 262,344.

*To all whom it may concern:*

Be it known that I, HENRY D. KUHLMAN, a citizen of the United States, residing at Westpoint, in the county of Cuming, State of Nebraska, have invented certain new and useful Improvements in Animal-Dehorning Stocks; and I do hereby declare the following to be a full, clear, and exact description of the invention, such as will enable others skilled in the art to which it appertains to make and use the same.

This invention relates to new and useful improvements in animal stocks and particularly to stocks for holding horned animals for the purpose of removing or cutting short the horns.

One object of the present invention is to provide a novel and improved device of this character wherein the holding bars are mounted so as to offer the least possible resistance to their successful and easy operation.

Another object is to provide novel and improved means for moving the holding bars toward or away from each other, and novel means for releasably holding the bars in engagement with the sides of the animal's neck.

Other objects and advantages will be apparent from the following description when taken in connection with the accompanying drawing.

In the drawing:

Figure 1 is a front elevation of the stock in closed position.

Fig. 2 is a top plan view of the same.

Figure 3:
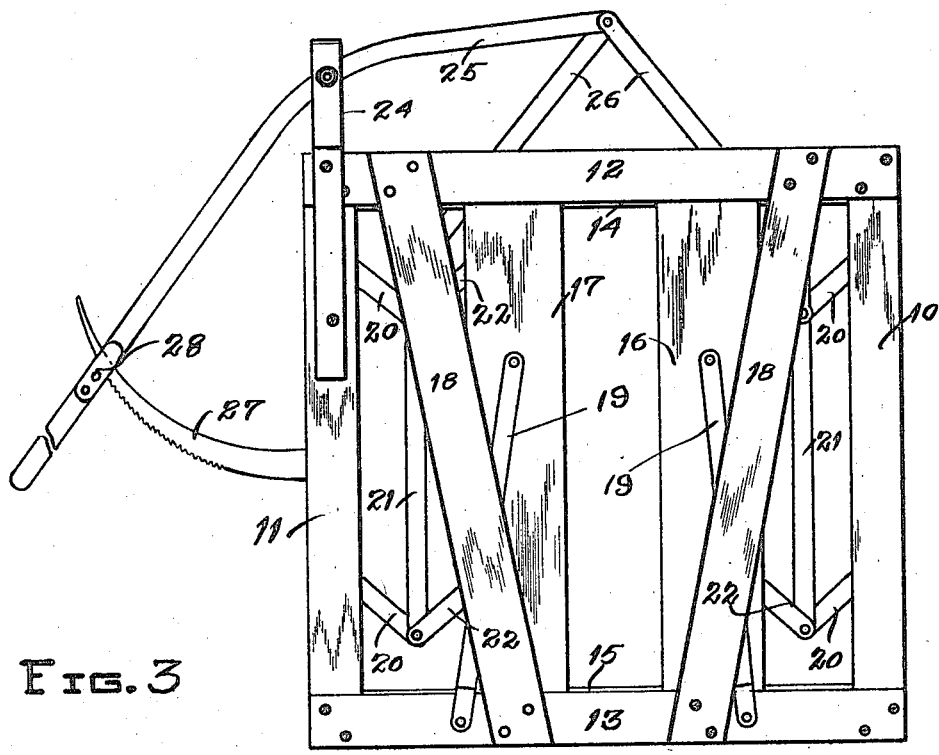
Fig. 3 is a rear elevation of the same.
Figure 4:
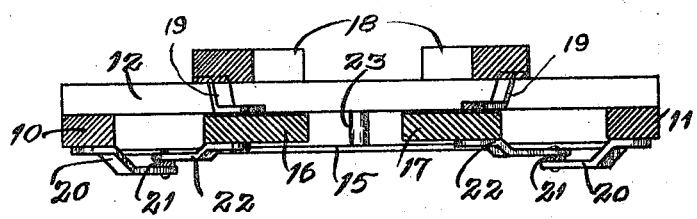
Fig. 4 is a horizontal sectional view taken on the line 4—4 of Fig. 1.

Referring particularly to the accompanying drawing, there is shown a frame which forms the end of an animal chute (not shown), and comprising the vertical side members 10 and 11 and the connecting upper and lower beams 12 and 13. It will be noted that the beams 12 and 13 are secured to one side of the members 10 and 11, and secured to the outer faces of the upper and lower ends of the members 10 and 11 are the horizontal metal retaining and grinding strips 14 and 15 for the upper and lower ends of the vertical holding bars 16 and 17. Secured to the outer faces of the beams 12 and 13, and diverging in an upward direction, are the beams 18. Pivotally secured to the lower beam 13, adjacent the lower ends of the beams 18 are the upwardly extending metal links 19, said links being pivotally connected at their upper ends to the holding bars 16. Pivotally connected to each of the vertical members 10 and 11 are the upper and lower links 20, their other ends being pivotally connected to the vertical rods 21. Similarly connected to each of the holding bars 16 are the links 22 their other ends being pivotally connected to the rods 21 at points coincident with the points of connection of the links 20. Disposed through the intermediate portions of the members 12 and 13 and the members 14 and 15, are the stop pins 23 against which the inner vertical edges of the bars 16 and 17 may abut when moved inwardly toward each other. Mounted on the upper end of the vertical member 11 is an upstanding bracket 24 on which is pivotally supported the bent lever 25. The upper end of this lever is pivotally connected to the upper convergent ends of a pair of links 26 which links have their lower ends pivotally connected to the upper ends of the vertical rods 21. An arcuate ratchet arm 27 is pivotally carried by the vertical member 11 and is engaged in a retaining member 28, carried by the lower portion of the lever 25, and adapted to engage its teeth with a single tooth 29 formed on said retaining member.

Thus when the lever is pulled outwardly from the member 11 the upper end of the lever will push downwardly on the links 26, causing said links to spread apart and force the rods 21 downwardly and away from each other, with the result that the holding bars 16 will be separated to permit the entrance of the animal's head therebetween. When the animal's head is disposed through the opening between the bars 16, the lever is pulled down, whereupon the bars 16 will be moved toward each other until they come into contact with the sides of the animal's neck. The teeth of the arcuate arm will engage the tooth of the retaining member and thus hold the bars against separation. The horns of the animal can be cut or trimmed, as desired, without danger of the animal getting loose.

What is claimed is:

An animal dehorning stock including a frame, holding bars mounted in the frame for movement toward and away from each other, a bent lever mounted on the frame, supporting links carried by the frame and connected to and movable with the bars, links connected to the lever, rods disposed adjacent and movable with the bars, and links connected to the bars and rods and to the rods and frame, said lever carried links being connected with the said rods for movement thereof, and means for holding the lever in adjusted positions.

In testimony whereof I affix my signature in the presence of two witnesses.

HENRY D. KUHLMAN.

Witnesses:
J. T. BAUMANN,
B. J. FISHER.